United States Patent Office 3,413,223
Patented Nov. 26, 1968

3,413,223
ESTER LUBRICANTS
Alan D. Forbes, Knaphill, Woking, and Patrick Gould, Weybridge, England, assignors to The British Petroleum Company Limited, London, England, a corporation of Great Britain
No Drawing. Filed Jan. 17, 1966, Ser. No. 520,917
Claims priority, application Great Britain, July 22, 1965, 31,249/65
7 Claims. (Cl. 252—37)

This invention relates to ester lubricants suitable for use at very high temperatures such as occur in the operation of modern aero gas turbin engines.

Lubricants used in the engines and other equipment of modern jet aircraft, particularly supersonic aircraft, have to operate at high bulk oil temperatures (in the region of 200° C. or more) which have the effect of greatly accelerating the thermal and oxidative deterioration of the lubricant.

The type of lubricating base oil most in favour at the present time for use in lubricating compositions for such aircraft consists of polyesters prepared from mono- and/or polyhydric alcohols having no beta hydrogen atoms and mono- and/or polycarboxylic acids. The expression "polyester" is used in this specification to mean esters having at least two ester linkages per molecule; it therefore includes diesters, for example di-(2:2:4-trimethylpentyl) sebacate and neopentyl glycol dipelargonate. These base oils have the advantage of being very thermally stable but their oxidation stability is not adequate for the purposes mentioned above. Examples of esters of this type are described, for example, in U.K. patent specifications 928,-789, 928,790, 933,505, 934,690, 934,720, 935,597, 971,901, 986,065, 986,066, 986,067, 986,068 and 990,024.

We now have found that ester base oils of improved oxidation stability at high temperatures (200° C. and above) can be produced by blending esters of the above type with certain other esters. We have further discovered that the good high temperature oxidation stability of the resulting blends can be improved still further by the addition of certain organo-metallic compounds, which are described in our co-pending United States applications Ser. No. 520,844 and Ser. No. 520,886, both filed on Jan. 17, 1966. This latter discovery is particularly surprising because we have found that certain conventional antioxidants for lubricants, for example, phenyl alpha naphthylamine, though effective in the new blends at low temperatures, are not very effective at high temperatures (200° C. and above) and, furthermore, many references exist in the literature describing the effects of metals and organo-metallic compounds on the oxidation of lubricating oils and these references indicate that organo-metallic compounds are often powerful oxidation catalysts.

According to the invention, there is provided a lubricating composition based on a blend of two ester oils, viz:

(1) a liquid aliphatic ester consisting of one or more neutral polyesters that have been prepared by reacting together under esterification conditions and in one or more stages:
    (a) a mono- and/or polyhydric alcohol having from 5 to 15, preferably from 5 to 8, carbon atoms per molecule and having no hydrogen atoms attached to any carbon atom in a β-position with respect to any —OH group and
    (b) a mono- and/or poly-carboxylic acid having from 2 to 14, preferably from 6 to 10, carbon atoms per molecule, and
(1) a liquid aromatic ester consisting of one or more diesters of the formula (Formula I)

where R is a saturated hydrocarbon group having from 1 to 14 carbon atoms and X and Y are hydrocarbon or oxygen-containing hydrocarbon groups having from 6 to 20 carbon atoms each of which either is a benzene ring or contains a benzene ring directly attached to the —COO— group.

Preferably the blend contains from 10 to 95% wt. of component (2), more preferably from 40 to 80%.

For most purposes, it is desirable that the viscosity of the blend shall be within the range from 1 to 30, preferably from 2 to 9, centistokes at 210° F. and these ranges also represent suitable ranges to achieve in the production of the individual components. A number of techniques have been described in the patent literature for the achievement of these viscosity ranges. The main variables influencing viscosity are: (a) the molecular weight and structure of individual reactants, (b) the ratio of the reactants used in the preparation of an ester product and (c) the ratio of the individual components forming a blend.

It is to be understood that in the esterification reaction described under (1) above there may be used more than one of any of the reactants mentioned, for example, a mixture of monocarboxylic acids, and, in any case, the neutral ester product of the esterification reaction will sometimes consist of a mixture of different ester molecules, so the expression "polyester" is to be construed in this light. The term "neutral" is used to mean a fully esterified product.

Examples of suitable acids and alcohols that may be used in the preparation of component (1) are: caprylic acid, capric acid, caproic acid, enanthic acid, pelargonic acid, adipic acid, sebacic acid, azelaic acid, tricarballylic acid, 2:2:4-trimethylpentanol, neopentyl alcohol, neopenyl glycol, trimethylolpropane and pentaerythritol.

For most purposes, the most suitable polyesters are esters of trimethylolpropane and/or pentaerythritol with one or more of the monocarboxylic acids mentioned in the previous paragraph.

Preferred thicker lubricating compositions may be produced by using, as component (1), complex esters prepared from trimethylolpropane, sebacic and/or azelaic acid, and one or more of the monocarboxylic acids mentioned in the previous paragraph. Most suitably, the trimethylolpropane and dicarboxylic acid are reacted in the molar ratio of 1:0.05–0.75, preferably 1:0.075–0.4, the amount of monocarboxylic acid being sufficient to provide a carboxyl/hydroxyl balance in the reactants.

The expression "oxygen-containing hydrocarbon group" is used herein in the restricted sense of meaning a group containing one or more ether oxygen atoms attached directly to benzene rings only. Examples of such groups include $C_6H_5OC_6H_4—$, $C_6H_5OC_6H_4OC_6H_4—$ and $$CH_3C_6H_4OC_6H_4—$$

Examples of classes of diesters of Formula I and their preparation are given in co-pending United States application Ser. No. 382,964, filed July 15, 1964, U.K. Patent application 19687/63, copending United States applications Ser. No. 400,243, filed Sept. 29, 1964, and Ser. No. 434,094, filed Feb. 19, 1965.

Particularly suitable classes of diesters for use as component (2) are those of the following two general formulae:

(Formula II)
$$(CH_3)_3CC_6H_4OOCR_1COOC_6H_4C(CH_3)_3$$

where $R_1$ is a polymethylene chain having from 2 to 14 carbon atoms (the tert. butyl groups are preferably in the ortho position) and (Formula III)
$$R_2C_6H_4[OC_6H_3(R_2)]_nOOCR_3COOC_6H_3(R_2)OC_6H_4R_2$$

where the $R_2$s (which may be the same or different) are hydrogen atoms or alkyl groups having from 1 to 14 carbon atoms, $R_3$ is a saturated divalent aliphatic hydrocarbon group, for example, a polymethylene group having from 2 to 14, preferably from 7 to 14, carbon atoms, and $n$ is 0 or 1. Preferred esters of Formula III are those of the formula $C_6H_5OC_6H_4OOCR_3COOC_6H_4OC_6H_5$ and those of the formula $R_2'C_6H_4OOCR_3COOC_6H_4OC_6H_5$ where $R_2'$ is a hydrogen atom or a tertiary butyl radical attached in the ortho position, $R_3$ is as specified above and the phenoxy groups are attached to the phenylene groups in the meta position.

Esters of Formulas II and III and their methods of preparation are described in co-pending United States applications Ser. Nos. 434,094 and 382,964.

According to a preferred form of the invention the lubricating composition also contains, dissolved in the base oil blend, an organo-metallic compound as hereinafter defined in an amount which gives a metal content of up to 500 parts per million (p.p.m.), preferably from 1 to 15 p.p.m., based on the total weight of the composition. It is to be understood that the composition may contain more than one organo-metallic compound.

The organo-metallic compounds present in the compositions according to the invention are those compounds which oxidise or reduce the organic radicals formed during oxidative degradation of esters, that is, salts of aliphatic acids having more than eight carbon atoms or complexes in which the ligands are composed of any or all of the elements carbon, hydrogen, oxygen and nitrogen. Suitable metals are the transition metals, especially the first transition series (according to the Periodic Table based on that of Mendeleeff), and the non-transition metals such as cerium, which metals can take part in "electron transfer" reactions. It is preferred to use those metals in which the oxidation potential of a couple between a lower and a higher oxidation state is greater than or equal to +0.75 (using the British sign convention and couples in acid solution). The organo-metallic compound must not be so volatile that it is distilled or evaporated out of the lubricating compositions at high temperatures, for example, above 200° C. It must also be soluble in the base oil.

The preferred transition metals are manganese and cobalt, though chromium or iron could also be used. Copper has been found to be a suitable transition metal. Cerium is a suitable non-transition metal.

The preferred complexes are the acetylacetonates, especially the hydrated acetylacetonates, for example, manganous and cobaltous acetylacetonates. Cupric phthalocyanine has also been found to be suitable.

A suitable copper salt is cupric stearate. We have found that organo-metallic compounds of this type act as high temperature antioxidants for example, at >200° C. in aliphatic/aromatic ester blends.

The compositions according to the invention advantageously also contain one or more conventional antioxidants of the amine, phenolic or sulphur type that are primarily effective at low temperatures (below 200° C.) in an amount sufficient for the purpose, usually from 0.5 to 5% by weight of the composition. For example, the aromatic amine antioxidants may be used, for example, iminodibenzyl, diphenylamine, phenyl-alpha-naphthylamine and phenyl-beta-naphthylamine. Particularly suitable are the alkylated aromatic amines, especially those of the formula $RC_6H_4NHC_6H_4R$ where the R's are alkyl groups having up to 14 carbon atoms (not necessarily the same at each occurrence in any given molecule), preferably octyl or nonyl groups. p,p'-Dioctyldiphenylamine is particularly effective. Other particularly suitable alkylated aromatic amines include the iminodibenzyls and N,N'-diphenyl-p-phenylenediamines. Suitable heterocyclic antioxidants are phenothiazine or the octylated phenothiazines.

A very desirable property of lubricants intended for use in aero gas turbine engines is that they should be substantially non-corrosive to copper and the properties of the lubricating compositions according to the invention may be improved in this respect by the addition of a copper passivator, usually in an amount of from 0.05 to 1.0% by weight of the composition.

Copper passivators are materials which reduce the extent to which copper is corroded by corrosive substances. Usually these additives act by forming an insoluble protective layer on the metallic surface thus preventing or reducing dissolution of the metal due to attack by materials which form soluble corrosion products. Copper passivators are effective in reducing the extent to which copper is corroded when exposed to lubricants for long periods at high temperatures and in the presence of air. Examples of copper passivators are heterocyclic amines and phosphorus compounds, for example, imidazoles, pyrazoles, triazoles, phosphites and trithiophosphites.

Particularly preferred lubricating compositions according to the invention contain in the aliphatic/aromatic ester base oil blend an organo-metallic compound as previously specified, an aromatic amine antioxidant and a copper passivator.

The load carrying properties of the compositions may be improved, if desired, by the addition of one or more load-carrying additives in an amount sufficient for the purpose, usually from 0.01 to 5% by weight of the composition. Examples of suitable load-carrying additives are described in our co-pending U.K. patent application 28,545/64.

The following examples serve to illustrate the invention.

High temperature oxidation tests were carried out on a series of aromatic/aliphatic ester blends, with and without organo-metallic additives and conventional amine antioxidants. The samples were heated for 5 hours at 259° C. Air was bubbled through the sample at a rate of 15 litres/hour. Oxidation stability was determined by measuring the viscosity and acidity increase in the oil during the test and the amount of oxygen consumed. The composition of the blends tested are given in the following table:

TABLE 1

| Additive | A | B | C | D | E |
|---|---|---|---|---|---|
| p,p'-Dioctyldiphenylamine, percent wt | 1.9 | 1.0 | 1.9 | Nil | Nil |
| Benzotriazole, percent wt | 0.2 | 0.1 | 0.2 | Nil | Nil |
| Cobaltous acetylacetonate dihydrate, p.p.m. Co. | 10 | Nil | Nil | 10 | Nil |

In the case of blends A and C the composition of the base fluid was 73.4% wt. of di-o-t-butylphenyl azelate and 24.5% wt. of trimethylol tricaprylate based on the total weight of the composition. In the case of blend B the composition was 74.2% wt. and 24.7% wt. respectively and in the case of blends D and E, 75.0% and 25.0% wt. respectively.

In the above table, p,p'-dioctyldiphenylamine is the conventional amine antioxidant, cobaltous acetylacetonate dihydrate is the organo-metallic derivative and benzotriazole is a copper passivator. The results obtained for the oxidation of these blends were compared with a reference oil (blend F), which was a typical aliphatic ester oil of comparable viscosity at 210° F. to that of the aromatic/aliphatic ester blends, i.e., from 7 to 9 centistokes. The composition of the reference oil was p,p'-dioctyldiphenylamine (4.0% wt.), benzotriazole (0.25% wt.) and a mixture of esters (95.75% wt.) synthesised from caprylic acid (11 mol), trimethylolpropane (4.3 mol) and sebacic acid (1 mol).

The oxidation tests of the various blends gave the results listed in the table below.

TABLE 2

| Blend | Time for 500 g. sample to consume 0.5 mol $O_2$ (h.) | $O_2$ uptake per 6 g. sample (ml.) | $KV_{210°}$ C. increase (%) | Acidity increase (mg. KOH/g.) |
|---|---|---|---|---|
| A | 3.2 | 180 | 67 | 2.5 |
| B | 0.50 | 462 | 242 | 35.6 |
| C | 0.55 | 540 | 160 | 35.9 |
| D | 0.45 | 490 | 140 | 36.6 |
| E | 0.10 | 756 | 383 | 45.4 |
| F | 0.20 | 812 | (¹) | (²) |

¹ Solidified.
² Not determined.

From a study of this table it can be seen that:

(a) All the aromatic/aliphatic ester blends were more stable to oxidation than the aliphatic ester oil.

(b) The most striking result was obtained for the blend containing both the organo-metallic compound and the amine antioxidant. The organo-metallic compound is apparently primarily responsible for the protection of the aromatic ester component and the amine antioxidant is apparently primarily responsible for the protection of the aliphatic ester component. The copper passivator, benzotriazole, is considered to have no effect on the oxidation. A comparison of the results for blends A and B indicates that it is the presence of the organo-metallic compound, which is responsible for the great resistance to oxidation of this blend.

(c) The organo-metallic compound retards oxidation of the blend in the absence of other additives, as can be seen by comparing the results for blends D and E.

(d) The oxidation of the aromatic/aliphatic ester blends is retarded by conventional amine antioxidants, as can be seen for the results for blends B and C. From these results it can be seen that an increase in the amine concentration from 1% to 2% wt. has little effect on the oxidation resistances. It is considered that amine antioxidants are relatively ineffective, compared with organometallic additives, in aromatic ester systems. Therefore, for effective protection of the aromatic/aliphatic ester blends the organo-metallic additive must be present.

Tests were carried out comparing the properties of the blend A with an inhibited aliphatic ester blend G. The ester used in blend G was of similar constitution to that used in blend F, but from a different batch, and was inhibited to the same degree by p,p'-dioctyldiphenylamine (4.0% wt.). Blend G also contained benzotriazole (0.25% wt.) as a copper passivator. The tests were carried out in a General Electric Roxana Panel Coker. In this apparatus, a sample of the oil is heated at 400° F. in a sump. A rotating paddle, half-immersed in the sample, throws the liquid on to a hot plate held at 200° F. The duration of the test is 8 hours and, at the end of the test, the weight of coke deposited on the hot plate and the changes in viscosity and acidity are measured. The test is a measure of the oxidative stability of a lubricant and of its coke-depositing characteristics. The results are given in the table below.

TABLE 3

| Sample | Coke deposit (mg.) | $KV_{100°\ F.}$ increase (percent) | Acidity increase (mg. KOH/g.) |
|---|---|---|---|
| A | 49 | 74 | 3.8 |
| G | 19 | 473 | 4.7 |

For both samples the coke deposit and acidity increases are well within the General Electric Specification A50T28A requirements (100 mg. and 6 mg. KOH/g. respectively). However, the viscosity change obtained for blend A is six to seven times less than that obtained for blend G.

We claim:

1. A lubricating composition comprising a blend of two ester oil components,
   the first of said ester oil components being
   (1) a liquid aliphatic ester consisting of at least one neutral polyester prepared by reacting together under esterification conditions in at least one stage;
      (a) an alcohol selected from the group consisting of a monohydric and polyhydric alcohol having from about 5 to about 15 carbon atoms per molecule and having no hydrogen atom attached to any carbon atom in a beta position with respect to any —OH group, and
      (b) a carboxylic acid selected from the group consisting of monocarboxylic acids and polycarboxylic acids having from about 2 to about 14 carbon atoms per molecule,
   said second ester oil component being
   (2) a liquid aromatic ester consisting of at least one diester having the general formula

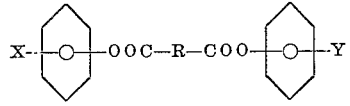

wherein R is a saturated hydrocarbon group having from 1 to 14 carbon atoms, X and Y are the same or different and each of said X and Y being selected from the group consisting of hydrogen, alkyl, aryl, alkyl-substituted aryl, diaryl, alkyl-substituted diaryl, aryloxy, alkyl-substituted aryloxy, diaryloxy, alkyl-substituted diaryloxy, and wherein the sum of the carbon atoms for X and Y does not exceed 14, one ester component being present in amounts sufficient to exert a stabilizing effect upon the other ester component, and both ester components being present in an amount sufficient to form a mixture predominantly composed of said two esters, 2. The lubricating composition of claim 1, wherein said composition contains from about 10% to about 95% of said second ester oil component, based on the total weight of the said lubricating composition.

3. The lubricating composition of claim 1, wherein said composition contains from about 40% to about 80% by weight of said second ester oil component, based on the total weight of the composition.

4. A lubricating composition comprising: a blend of two ester oil components,
   the first of said ester oil components being
   (1) a liquid aliphatic ester consisting of at least one neutral polyester prepared by reacting together under esterification conditions in at least one stage:
      (a) an alcohol selected from the group consisting of a monohydric and polyhydric alcohol having from about 5 to about 15 carbon atoms per molecule and having no hydrogen atom attached to any carbon atom in a beta position with respect to any —OH group, and
      (b) a carboxylic acid selected from the group consisting of monocarboxylic acids and polycarboxylic acids having from about 2 to about 14 carbon atoms per molecule, said second ester oil component being (2) a liquid aromatic ester consisting of at least one diester having the general formula

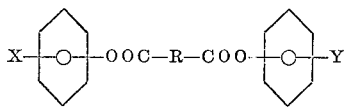

wherein R is a saturated hydrocarbon group having from 1 to 14 carbon atoms, X and Y are the same or different and each of said X and Y being selected from the group consisting of hydrogen, alkyl, aryl, alkyl-substituted aryl, diaryl, alkyl-substituted diaryl, aryloxy, alkyl-substituted aryloxy, diaryloxy, alkyl-substituted diaryloxy, and wherein the sum of the carbon atoms for X and Y does not exceed 14;

one ester component being present in amounts sufficient to exert a stabilizing effect upon the other ester component, and both ester components being present in an amount sufficient to form a mixture predominantly composed of said two esters, said composition also containing at least one organo-metallic compound selected from the group consisting of (1) salts of carboxylic acids containing from 8 to 22 carbon atoms, (2) chelates of beta di-ketones having the formula

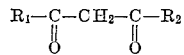

wherein $R_1$ and $R_2$ are selected from the group consisting of alkyl, cycloalkyl, and aromatic groups containing from 1 to 10 carbon atoms, and (3) metal phthalocyanines, wherein the metal component of said organo-metallic compound is selected from the group consisting of metals of the first transition series according to the Periodic Table of Mendeleeff and cerium, said organo-metallic compound being present in an amount which produces a metal content of up to 500 parts per million, based on the total weight of the lubricating composition.

5. The lubricating composition of claim 4, wherein said composition has a metal content of from 1 to about 15 parts per million, based on the total weight of the lubricating composition.

6. A lubricating composition comprising: a blend of two ester oil components, the first of said ester oil components being (1) a liquid aliphatic ester consisting of at least one neutral polyester prepared by reacting together under esterification conditions in at least one stage:

(a) an alcohol selected from the group consisting of a monohydric and polyhydric alcohol having from about 5 to about 15 carbon atoms per molecule and having no hydrogen atom attached to any carbon atom in a beta position with respect to any —OH group, and (b) a carboxylic acid selected from the group consisting of monocarboxylic acids and polycarboxylic acids having from about 2 to about 14 carbon atoms per molecule, said second ester oil component being (2) a liquid aromatic ester consisting of at least one diester having the general formula

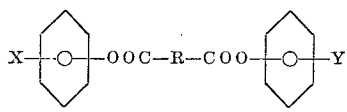

wherein R is a saturated hydrocarbon group having from 1 to 14 carbon atoms, X and Y are the same or different and each of said X and Y being selected from the group consisting of hydrogen, alkyl, aryl, alkyl-substituted aryl, diaryl, alkyl-substituted diaryl, aryloxy, alkyl-substituted aryloxy, diaryloxy, alkyl-substituted diaryloxy, and wherein the sum of the carbon atoms for X and Y does not exceed 14, wherein the amount of said component is from about 40% to 80% by weight, based on the total composition;

one ester component being present in amounts sufficient to exert a stabilizing effect upon the other ester component, and both ester components being present in an amount sufficient to form a mixture predominantly composed of said two esters, said composition also containing at least one organo-metallic compound selected from the group consisting of (1) salts of carboxylic acids containing from 8 to 22 carbon atoms, (2) chelates of beta di-ketones having the formula

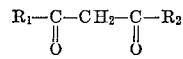

wherein $R_1$ and $R_2$ are selected from the group consisting of alkyl, cycloalkyl, and aromatic groups containing from 1 to 10 carbon atoms, and (3) metal phthalocyanines, wherein said metal component is selected from the group consisting of metals of the first transition series according to the Periodic Table of Mendeleeff and cerium, said organo-metallic compound being present in an amount which produces a metal content of about 1 to 15 parts per million, based on the total weight of the composition.

7. A lubricating composition comprising: a blend of two ester oil components, the first of said ester oil components being (1) a liquid aliphatic ester consisting of at least one neutral polyester prepared by reacting together under esterification conditions in at least one stage;

(a) an alcohol selected from the group consisting of a monohydric and polyhydric alcohol having from about 5 to about 15 carbon atoms per molecule and having no hydrogen atom attached to any carbon atom in a beta position with respect to any —OH group, and (b) a carboxylic acid selected from the group consisting of monocarboxylic acids and polycarboxylic acids having from about 2 to about 14 carbon atoms per molecule, said second ester oil component being (2) a liquid aromatic ester consisting of at least one diester having the general formula

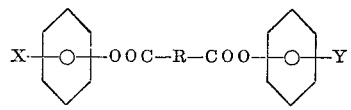

wherein R is a saturated hydrocarbon group having from 1 to 14 carbon atoms, X and Y are the same or different and each of said X and Y being selected from the group consisting of hydrogen, alkyl, aryl, alkyl-substituted aryl, diaryl, alkyl-substituted diaryl, aryloxy, alkyl-substituted aryloxy, diaryloxy, alkyl-substituted diaryloxy, and wherein the sum of the carbon atoms for X and Y does not exceed 14, and wherein the amount of said component is from about 40% to 80% by weight, based on the total weight of the composition;

one ester component being present in amounts sufficient to exert a stabilizing effect upon the other ester component, and both ester components being present in an amount sufficient to form a mixture predominantly composed of said two esters, said composition also containing at least one organo-metallic compound selected from the group consisting of (1) salts of carboxylic acids containing from 8 to 22 carbon atoms, (2) chelates of beta di-ketones having the formula

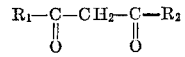

wherein $R_1$ and $R_2$ are selected from the group consisting of alkyl, cycloalkyl, and aromatic groups containing from 1 to 10 carbon atoms, and (3) metal phthalocyanines, wherein said metal component is selected from the group consisting of metals of the first transition series according to the Periodic Table of Mendeleeff and cerium, said organo-metallic compound being present in an amount which produces a metal content of about 1 to 15 parts per million, based on the total weight of the composition; and also said composition, in addition, containing minor amounts of a low-temperature antioxidant selected from the group of amine, phenolic and sulphur antioxidants, and a copper passivator.

References Cited

UNITED STATES PATENTS

| | | | |
|---|---|---|---|
| 2,963,433 | 12/1960 | Little et al. | 252—32.7 |
| 3,003,859 | 10/1961 | Irish et al. | 252—42.7 |
| 3,018,248 | 1/1962 | Foehr | 252—37 |
| 3,023,164 | 2/1962 | Lawton et al. | 252—49.7 |
| 3,053,768 | 9/1962 | Cupper | 252—565 |
| 3,093,585 | 6/1963 | Low et al. | 252—37 |
| 3,197,408 | 7/1965 | Cupper et al. | 252—565 |
| 2,231,248 | 2/1941 | Bowden | 252—57 |
| 2,305,627 | 12/1942 | Lincoln et al. | 252—49.7 XR |
| 2,529,300 | 11/1950 | Lieber | 252—52 |
| 2,795,549 | 6/1957 | Abbott et al. | 252—49.7 |
| 3,128,302 | 4/1964 | Martinek | 252—57 XR |
| 3,137,703 | 6/1964 | Burbach | 252—57 XR |

FOREIGN PATENTS

| | | |
|---|---|---|
| 793,115 | 4/1958 | Great Britain. |
| 824,249 | 12/1959 | Great Britain. |
| 934,720 | 8/1963 | Great Britain. |

PATRICK P. GARVIN, *Primary Examiner.*

W. CANNON, *Assistant Examiner.*

UNITED STATES PATENT OFFICE
CERTIFICATE OF CORRECTION

Patent No. 3,413,223            November 26, 1968

Alan D. Forbes et al.

It is certified that error appears in the above identified patent and that said Letters Patent are hereby corrected as shown below:

Column 3, line 24, "14" should read -- 4 --.

Signed and sealed this 17th day of March 1970.

(SEAL)
Attest:

Edward M. Fletcher, Jr.             WILLIAM E. SCHUYLER, JR.
Attesting Officer                        Commissioner of Patents